US012643821B2

(12) United States Patent
Li et al.

(10) Patent No.: US 12,643,821 B2
(45) Date of Patent: Jun. 2, 2026

(54) USE OF GRAPHENE OXIDE/BUTYL ACRYLATE/SILANE COMPOSITE EMULSION AS ANTI-SHRINKAGE AGENT

(71) Applicant: QINGDAO UNIVERSITY OF TECHNOLOGY, Qingdao (CN)

(72) Inventors: Shaochun Li, Qingdao (CN); Shilin Xu, Qingdao (CN); Ang Liu, Qingdao (CN); Yongjuan Geng, Qingdao (CN); Dongshuai Hou, Qingdao (CN); Ruiyong Zhang, Qingdao (CN); Zuquan Jin, Qingdao (CN); Song Gao, Qingdao (CN)

(73) Assignee: QINGDAO UNIVERSITY OF TECHNOLOGY, Qingdao (CN)

( * ) Notice: Subject to any disclaimer, the term of this patent is extended or adjusted under 35 U.S.C. 154(b) by 128 days.

(21) Appl. No.: 17/999,157

(22) PCT Filed: Jul. 27, 2021

(86) PCT No.: PCT/CN2021/108635
§ 371 (c)(1),
(2) Date: Nov. 17, 2022

(87) PCT Pub. No.: WO2023/272845
PCT Pub. Date: Jan. 5, 2023

(65) Prior Publication Data
US 2024/0300857 A1 Sep. 12, 2024

(30) Foreign Application Priority Data
Jun. 28, 2021 (CN) .......................... 202110720469.2

(51) Int. Cl.
| | |
|---|---|
| *C04B 14/04* | (2006.01) |
| *C04B 24/04* | (2006.01) |
| *C04B 24/32* | (2006.01) |
| *C04B 24/42* | (2006.01) |
| *C04B 40/00* | (2006.01) |
| *C04B 103/40* | (2006.01) |
| *C08F 2/44* | (2006.01) |
| *C04B 28/00* | (2006.01) |
| *C04B 28/04* | (2006.01) |
| *C04B 103/56* | (2006.01) |
| *C04B 111/34* | (2006.01) |
| *C08F 120/18* | (2006.01) |

(52) U.S. Cl.
CPC ............ *C04B 24/04* (2013.01); *C04B 14/045* (2013.01); *C04B 24/32* (2013.01); *C04B 24/42* (2013.01); *C04B 40/0046* (2013.01); *C08F 2/44* (2013.01); *C04B 28/00* (2013.01); *C04B 28/04* (2013.01); *C04B 40/0039* (2013.01);

*C04B 2103/408* (2013.01); *C04B 2103/58* (2013.01); *C04B 2111/34* (2013.01); *C08F 120/18* (2013.01); *Y02W 30/91* (2015.05)

(58) Field of Classification Search
CPC ....... C04B 24/04; C04B 14/045; C04B 24/32; C04B 24/42; C04B 40/0046; C04B 28/00; C04B 28/04; C04B 40/0039; C04B 2103/408; C04B 2103/58; C04B 2111/34; C04B 14/04; C04B 40/00; C04B 12/04; C04B 14/022; C04B 24/02; C04B 24/08; C04B 24/2641; C04B 40/0028; C04B 40/0082; C04B 22/06; C04B 24/045; C08F 2/44; C08F 120/18; Y02W 30/91
See application file for complete search history.

(56) References Cited

FOREIGN PATENT DOCUMENTS

| | | | | |
|---|---|---|---|---|
| CN | 101746988 | 6/2010 | | |
| CN | 104058676 | 9/2014 | | |
| CN | 107652817 A | * 2/2018 | ............ | C08F 120/14 |
| CN | 107699130 A | * 2/2018 | ............. | C04B 28/00 |
| JP | 2014181156 A | * 9/2014 | | |

OTHER PUBLICATIONS

CN-107652817-A, machine translation (Year: 2018).*
CN-107699130-A, machine translation (Year: 2018).*
JP-2014181156-A, machine translation (Year: 2014).*
Szabo et al. Size-dependent aggregation of graphene oxide, Carbon, v 160, 2020, pp. 145-155, doi: 10.1016/j.carbon.2020.01.022. (Year: 2020).*
PCT International Application No. PCT/CN21/108635, International Search Report, dated Jun. 28, 2021, 5 pages.

* cited by examiner

*Primary Examiner* — Marites A Guino-O Uzzle
(74) *Attorney, Agent, or Firm* — DLA Piper LLP (US)

(57) ABSTRACT

The present disclosure provides use of a graphene oxide/ butyl acrylate/silane composite emulsion as an anti-shrinkage agent of a cement-based material. In the present disclosure, active groups on an isobutyltriethoxysilane molecule reacts with hydroxyl groups on a surface of a mortar to form a layered hydrophobic structure, thereby slowing a water loss in the mortar of the cement-based material and avoiding cracking caused by drying shrinkage. Butyl acrylate can be dehydrated to form polymer fibers with a spatial network to fill pores of a cement paste, thereby limiting the shrinkage of the mortar. Graphene oxide has a relatively large specific surface area and oxygen-containing functional groups on a surface, which can provide growth sites for hydration products, and promote the hydration products to form a regular and dense structure in the form of a template, thus ensuring a strength of the cement-based material.

16 Claims, 11 Drawing Sheets

USE OF GRAPHENE OXIDE/BUTYL ACRYLATE/SILANE COMPOSITE EMULSION AS ANTI-SHRINKAGE AGENT

CROSS REFERENCE TO RELATED APPLICATION

The present application is a U.S. national stage under 35 U.S.C. § 371 of International Application No. PCT/CN2021/108635 filed on Jul. 27, 2021 which claims the benefit of and priority to Chinese Patent Application No. 202110720469.2, filed with the China National Intellectual Property Administration (CNIPA) on Jun. 28, 2021, and entitled "USE OF GRAPHENE OXIDE/BUTYL ACRYLATE/SILANE COMPOSITE EMULSION AS ANTI-SHRINKAGE AGENT", each of which are hereby incorporated herein by reference in their entirety.

TECHNICAL FIELD

The present disclosure relates to the technical field of cement-based materials, in particular to use of a graphene oxide/butyl acrylate/silane composite emulsion as an anti-shrinkage agent of a cement-based material.

BACKGROUND

Concrete is a typical cement-based material widely used in roads, bridges, and dams and other projects due to easy availability and relatively-low price. However, during the solidification and hardening, the cracking caused by concrete shrinkage has always been unavoidable. For ordinary concrete, drying shrinkage is a main factor causing concrete cracking, accounting for about 80% to 90% of the total shrinkage. Drying shrinkage is caused by the rapid internal water loss due to a fact that the concrete has a relative humidity inside higher than that of the outside environment. With the water loss, a water level inside capillary tubes in the material drops, and the meniscus has an increased curvature, resulting in an increase in surface tension to produce pressures on the capillary wall; the capillary tubes continue to lose water, and the concrete continues to be under an increasing pressure. As a result, the drying shrinkage of a concrete volume appears, adversely affecting a service life of the building.

Silane materials (such as isobutyltriethoxysilane) are excellent concrete waterproofing materials that have a desirable permeability and an excellent waterproof effect, and do not affect the air permeability of concrete, which are expected to reduce a shrinkage performance of the cement-based materials. Butyl acrylate can also be dehydrated during cement hydration to form network polymer fibers to fill pores, thus limiting the shrinkage of the mortar. However, film formation of the above two materials may affect a cement hydration rate, resulting in a decrease in the strength of a cement matrix.

SUMMARY

In view of this, an objective of the present disclosure is to provide use of a graphene oxide/butyl acrylate/silane composite emulsion as an anti-shrinkage agent in a cement-based material. In the present disclosure, the graphene oxide/butyl acrylate/silane composite emulsion is used as an anti-shrinkage agent of the cement-based material, which can improve a crack resistance of the cement-based material while ensuring a strength of the cement-based material.

To achieve the above objective of the present disclosure, the present disclosure provides the following technical solutions.

The present disclosure provides use of a graphene oxide/butyl acrylate/silane composite emulsion as an anti-shrinkage agent in a cement-based material.

Preferably, the graphene oxide/butyl acrylate/silane composite emulsion includes graphene oxide, butyl acrylate, isobutyltriethoxysilane, sodium silicate, an emulsifier, a dispersant, and water.

Preferably, the emulsifier includes a first emulsifier being one or more selected from the group consisting of Span® 80 (sorbitan monooleate), propylene glycol fatty acid ester, and sorbitan monostearate, and a second emulsifier being one or more selected from the group consisting of Peregal® (fatty alcohol polyoxyethylene ether), Tween® 20 (polysorbate 20), and sodium lauryl sulfate (SLS).

Preferably, the graphene oxide has a sheet thickness of 0.8 nm to 1.2 nm and a diameter of 30 nm to 70 nm.

Preferably, the dispersant is polyethylene glycol 2000 (PEG 2000).

Preferably, the graphene oxide/butyl acrylate/silane composite emulsion includes the following components by mass percentage:

| | |
|---|---|
| the graphene oxide | 0.001% to 0.5%; |
| the isobutyltriethoxysilane | 15% to 70%; |
| the butyl acrylate | 15% to 70%; |
| the sodium silicate | 10% to 40%; |
| the first emulsifier | 0.1% to 2%; |
| the second emulsifier | 0.1% to 3%; |
| the dispersant | 0.1% to 1%; and |
| water | as a balance. |

Preferably, a preparation method of the graphene oxide/butyl acrylate/silane composite emulsion includes the following steps:

(1) conducting first mixing on the first emulsifier, the butyl acrylate, the isobutyltriethoxysilane, and the dispersant to obtain an oil phase;

(2) conducting second mixing on the graphene oxide, the second emulsifier, the sodium silicate, and water to obtain an aqueous phase; and (3) adding the oil phase to the aqueous phase to conduct emulsification to obtain the graphene oxide/butyl acrylate/silane composite emulsion; where step (1) and step (2) are conducted in any order.

Preferably, the first mixing is conducted at 1,000 r/min to 2,200 r/min and 30° C. to 65° C.; and the second mixing is conducted at 1,000 r/min to 2,200 r/min and 30° C. to 65° C.

Preferably, the emulsification is conducted at 30° C. to 80° C. for 4 h to 8 h by stirring at 1,300 r/min to 2,500 r/min.

Preferably, a use method includes the following steps:

mixing the graphene oxide/butyl acrylate/silane composite emulsion with the cement-based material and water to obtain a cement mortar; and conducting maintenance on the cement mortar.

Preferably, the graphene oxide/butyl acrylate/silane composite emulsion has a mass of 1% to 3% of a mass of the cement-based material, and has a solid content of 70% to 90%.

Preferably, the graphene oxide/butyl acrylate/silane composite emulsion has the mass of 2% of the mass of the cement-based material.

Preferably, the cement mortar has a water-cement ratio of 0.4 to 0.6 and a cement-sand ratio of 1:3.

Preferably, the maintenance is conducted at 15° C. to 25° C. with a relative humidity of greater than or equal to 50%.

The present disclosure further provides a cement-based material, using a graphene oxide/butyl acrylate/silane composite emulsion as an anti-shrinkage agent.

The present disclosure further provides a graphene oxide/butyl acrylate/silane composite emulsion, including graphene oxide, butyl acrylate, isobutyltriethoxysilane, sodium silicate, an emulsifier, a dispersant, and water.

Preferably, the emulsifier includes a first emulsifier being one or more selected from the group consisting of Span® 80 (sorbitan monooleate), propylene glycol fatty acid ester, and sorbitan monostearate, and a second emulsifier being one or more selected from the group consisting of Peregal® (fatty alcohol polyoxyethylene ether), Tween® 20 (polysorbate 20), and sodium lauryl sulfate (SLS).

Preferably, the graphene oxide has a sheet thickness of 0.8 nm to 1.2 nm and a diameter of 30 nm to 70 nm.

Preferably, the dispersant is polyethylene glycol 2000 (PEG 2000).

Preferably, the graphene oxide/butyl acrylate/silane composite emulsion includes the following components by mass percentage:

| | |
|---|---|
| the graphene oxide | 0.001% to 0.5%; |
| the isobutyltriethoxysilane | 15% to 70%; |
| the butyl acrylate | 15% to 70%; |
| the sodium silicate | 10% to 40%; |
| the first emulsifier | 0.1% to 2%; |
| the second emulsifier | 0.1% to 3%; |
| the dispersant | 0.1% to 1%; and |
| water | as a balance. |

The present disclosure provides use of a graphene oxide/butyl acrylate/isobutyltriethoxysilane (GO/BA/IBTS) composite emulsion as an anti-shrinkage agent in a cement-based material. In the present disclosure, active groups on an isobutyltriethoxysilane molecule reacts with hydroxyl groups in water of the mortar to form a layered hydrophobic structure, thereby slowing a water loss in the mortar of the cement-based material and avoiding cracking caused by drying shrinkage. The butyl acrylate can be dehydrated during cement hydration to form network-shaped polymer fibers to fill pores like microfibers, thereby limiting the shrinkage of the mortar. The graphene oxide has a relatively large specific surface area and surface oxygen-containing functional groups, which can provide growth sites for hydration products, and promote the hydration products to form a regular and dense structure in the form of a template; this regular and dense structure is filled in voids of a cement matrix, which can improve a pore structure, increase a density of the cement matrix, and block expansion of micro-cracks in the cement-based material, thus ensuring a strength of the cement-based material. The sodium silicate mixed into the cement-based material can be hydrolyzed to form silica gel; the silica gel can react with calcium ions in a cement-based system to form a C—S—H gel, which fills pores of the matrix to improve an early strength of the cement-based material. The results of examples show that when the GO/BA/IBTS composite emulsion has a content of 2 wt %, the mortar after maintaining for 28 d has drying shrinkage of only 76% of that of the mortar in a blank group, a compressive strength of 5% higher than that of the mortar in the blank group, and a bending strength of 10% higher than that of the mortar in the blank group.

DETAILED DESCRIPTION OF THE EMBODIMENTS

Figure 1:
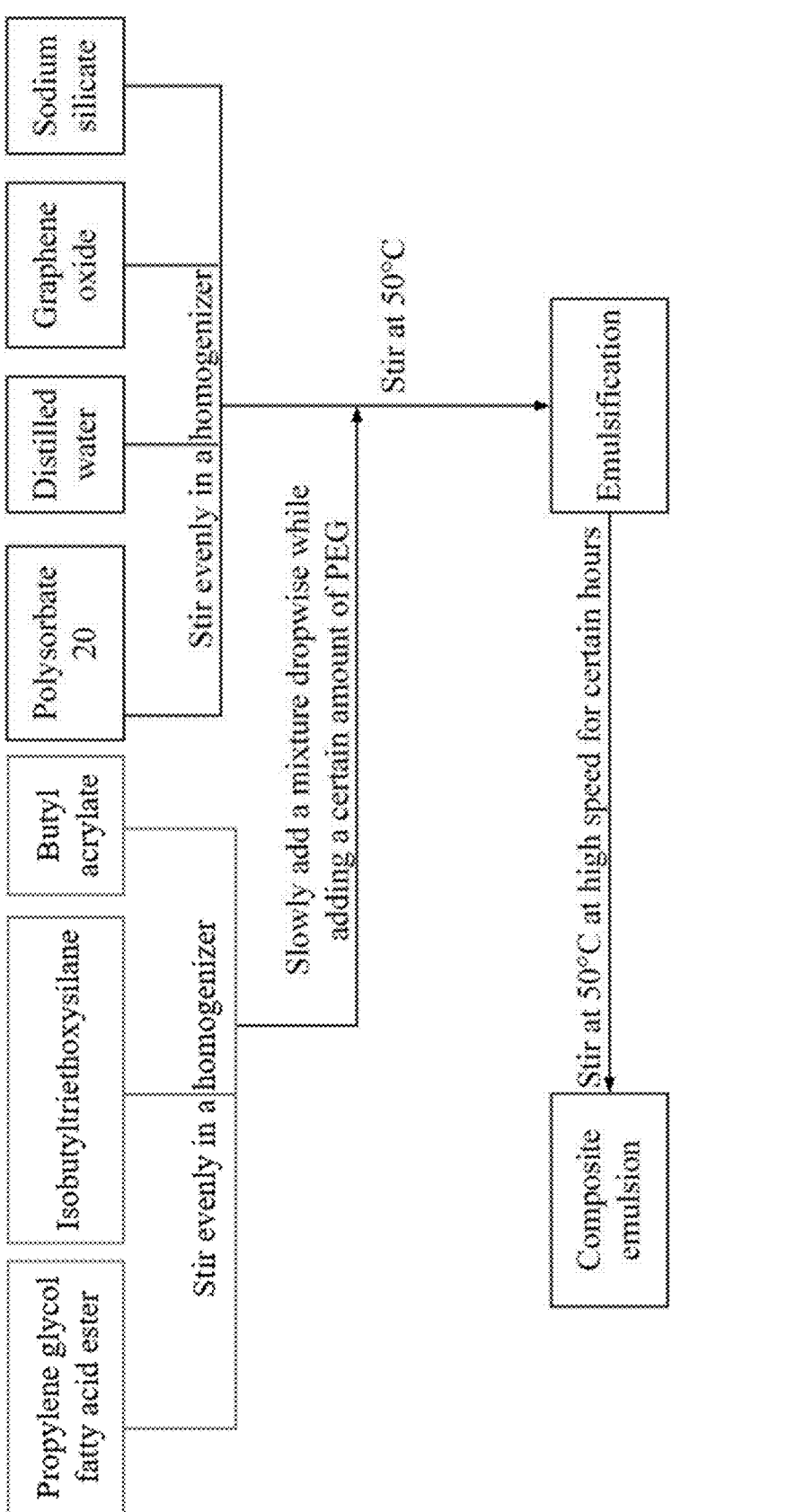
FIG. 1 shows a flow chart of a preparation method of a GO/BA/IBTS composite emulsion.

The present disclosure provides use of a graphene oxide/butyl acrylate/silane composite emulsion as an anti-shrinkage agent in a cement-based material. The graphene oxide/butyl acrylate/silane composite emulsion includes preferably graphene oxide, butyl acrylate, isobutyltriethoxysilane, sodium silicate, an emulsifier, a dispersant, and water.

In the present disclosure, there is no special requirement for the cement-based material, and cement-based materials well-known to those skilled in the art can be used, such as a concrete.

In the present disclosure, the emulsifier includes preferably a first emulsifier being one or more selected from the group consisting of preferably Span® 80 (sorbitan monooleate), propylene glycol fatty acid ester, and sorbitan monostearate, and a second emulsifier being one or more selected from the group consisting of preferably Peregal® (fatty alcohol polyoxyethylene ether), Tween® 20 (polysorbate 20), and SLS.

In the present disclosure, the dispersant is preferably PEG 2000.

In the present disclosure, the graphene oxide/butyl acrylate/silane composite emulsion includes preferably the following components by mass percentage:

| | |
|---|---|
| the graphene oxide | 0.001% to 0.5%; |
| the isobutyltriethoxysilane | 15% to 70%; |
| the butyl acrylate | 15% to 70%; |
| the sodium silicate | 10% to 40%; |
| the first emulsifier | 0.1% to 2%; |
| the second emulsifier | 0.1% to 3%; |
| the dispersant | 0.1% to 1%; and |
| water | as a balance. |

Unless otherwise specified, the above materials are commercially-available products conventional in the art.

In terms of mass percentage, the graphene oxide/butyl acrylate/silane composite emulsion includes preferably 0.001% to 0.5%, more preferably 0.01% to 0.3%, and further more preferably 0.05% to 0.2% of graphene oxide. The graphene oxide has a sheet thickness of preferably 0.8 nm to 1.2 nm, and a diameter of preferably 30 nm to 70 nm.

In terms of mass percentage, the graphene oxide/butyl acrylate/silane composite emulsion includes preferably 15% to 70%, more preferably 30% to 60%, and further more preferably 40% to 50% of isobutyltriethoxysilane.

In terms of mass percentage, the graphene oxide/butyl acrylate/silane composite emulsion includes preferably 15% to 70%, more preferably 30% to 70%, and further more preferably 40% to 60% of butyl acrylate.

In terms of mass percentage, the graphene oxide/butyl acrylate/silane composite emulsion includes preferably 10% to 40%, more preferably 20% to 30% of sodium silicate.

In terms of mass percentage, the graphene oxide/butyl acrylate/silane composite emulsion includes preferably 0.1% to 2%, more preferably 0.5% to 1.5% of a first emulsifier.

In terms of mass percentage, the graphene oxide/butyl acrylate/silane composite emulsion includes preferably 0.1% to 3%, more preferably 0.5% to 2% of a second emulsifier.

In terms of mass percentage, the graphene oxide/butyl acrylate/silane composite emulsion includes preferably 0.1% to 1%, more preferably 0.3% to 0.8% of a dispersant.

In terms of mass percentage, the graphene oxide/butyl acrylate/silane composite emulsion further includes water as a balance.

Preferably, a preparation method of the graphene oxide/butyl acrylate/silane composite emulsion includes preferably the following steps:

(1) conducting first mixing on the first emulsifier, the isobutyltriethoxysilane, the butyl acrylate, and the dispersant to obtain an oil phase;

(2) conducting second mixing on the graphene oxide, the second emulsifier, the sodium silicate, and water to obtain an aqueous phase; and (3) adding the oil phase to the aqueous phase to conduct emulsification to obtain the graphene oxide/butyl acrylate/silane composite emulsion; where step (1) and step (2) are conducted in any order.

In the present disclosure, the first mixing is conducted on the first emulsifier, the isobutyltriethoxysilane, the butyl acrylate, and the dispersant to obtain the oil phase. The first mixing is conducted preferably using a homogenizer at preferably 1,000 r/min to 2,200 r/min, more preferably 1,500 r/min to 2,000 r/min and preferably 30° C. to 65° C., more preferably 40° C. to 55° C. There is no special requirement for a time of the first mixing, as long as the oil phase can be mixed uniformly.

In the present disclosure, second mixing is conducted on the graphene oxide, the second emulsifier, the sodium silicate, and water to obtain the aqueous phase. The second mixing is conducted preferably using a homogenizer at preferably 1,000 r/min to 2,200 r/min, more preferably 1,500 r/min to 2,000 r/min and preferably 30° C. to 65° C., more preferably 40° C. to 55° C. There is no special requirement for a time of the second mixing, as long as the oil phase can be mixed uniformly.

In the present disclosure, the oil phase is added to the aqueous phase to conduct emulsification to obtain the graphene oxide/butyl acrylate/silane composite emulsion. The oil phase is preferably added dropwise at 2 drops/s to 5 drops/s. During adding the oil phase dropwise, preferably constant-temperature stirring is conducted at preferably 50° C.

In the present disclosure, the emulsification is conducted preferably with stirring. The emulsification is conducted at preferably 30° C. to 80° C., more preferably 45° C. to 60° C. for preferably 4 h to 8 h, more preferably 5 h to 6 h. The emulsification is conducted at preferably 1,300 r/min to 2,500 r/min, more preferably 1,500 r/min to 2,000 r/min. The emulsification is started after the oil phase is added dropwise.

In the present disclosure, a use method of the graphene oxide/butyl acrylate/silane composite emulsion as an anti-shrinkage agent of a cement-based material includes preferably the following steps:

mixing the graphene oxide/butyl acrylate/silane composite emulsion with the cement-based material and water to obtain a cement mortar; and conducting maintenance on the cement mortar.

In the present disclosure, the graphene oxide/butyl acrylate/silane composite emulsion has a mass of 1% to 3%, more preferably 2% of a mass of the cement-based material, and has a solid content of preferably 70% to 90%, more preferably 75% to 85%.

In the present disclosure, there is no special requirement for a mixing method, and mixing methods well known to those skilled in the art can be used. The cement mortar has a water-cement ratio of preferably 0.4 to 0.6 and a cement-sand ratio of preferably 1:3.

In the present disclosure, the maintenance is conducted at preferably 15° C. to 25° C., more preferably 20° C. with a relative humidity of greater than or equal to 50%, more preferably 55% to 60%.

The present disclosure further provides a cement-based material, using a graphene oxide/butyl acrylate/silane composite emulsion as an anti-shrinkage agent.

The use of a graphene oxide/butyl acrylate/silane composite emulsion as an anti-shrinkage agent of a cement-based material provided by the present disclosure is described in detail below with reference to the examples, but these examples may not be understood as a limitation to the protection scope of the present disclosure.

Example 1

A graphene oxide/butyl acrylate/silane composite emulsion was prepared by the following raw materials:

| | |
|---|---|
| graphene oxide | 0.3%; |
| isobutyltriethoxysilane | 35%; |
| butyl acrylate | 22%; |
| sodium silicate | 20%; |
| Tween 20 | 0.7%; |
| porpylene glycol fatty acid ester | 1.5%; |
| PEG 2000 | 0.5%; and |
| water | 20%. |

A preparation method included the following steps:

(1) the Tween® 20 (polysorbate 20), the isobutyltriethoxysilane, the butyl acrylate, and the dispersant were subjected to first mixing by stirring with a homogenizer at 2,000 r/min and 40° C. to obtain an oil phase;

(2) the graphene oxide, the propylene glycol fatty acid ester, the sodium silicate, and water were subjected to second mixing by stirring with the homogenizer at 2,000 r/min and 40° C. to obtain an aqueous phase; and (3) the oil phase was added dropwise to the aqueous phase while stirring at 50° C., an obtained mixture was subjected to emulsification under stirring at 2,500 r/min and 50° C. for 4 h to obtain the graphene oxide/butyl acrylate/silane composite emulsion; where a flow chart of the preparation method was shown in FIG. 1.

A test cement was P.O 42.5 ordinary Portland cement produced by Qingdao Shanshui Cement Plant; a chemical composition is tested according to "General Portland Cement" (GB175-2007), and specific components were shown in Table 1.

TABLE 1

| Cement Chemical Composition | | | | | | | | |
|---|---|---|---|---|---|---|---|---|
| Chemical composition/% | Silica | Iron oxide | Alumina | Calcium oxide | Magnesium Oxide | Sulphur trioxide | Sodium oxide | Others |
| P.O 42.5 | 23.10 | 3.67 | 7.10 | 57.59 | 2.18 | 2.65 | 0.18 | 3.53 |

The mortar had a water-cement ratio of 0.6 and a cement-sand ratio of 1:3; the silane composite emulsion had a content of 1%, 2%, 3%, and 4% of a cement mass; an amount of water was deducted from water contained in the silane composite emulsion to ensure that the water-cement ratio of the mortar remained unchanged. The specific mixing ratio was shown in Table 2.

TABLE 2

| Mortar mix ratio | | | | |
|---|---|---|---|---|
| SN | Cement/g | Sand/g | Water/g | GO/BA/IBTS composite emulsion/g |
| B | 450 | 1350 | 270 | 0 |
| G1 | 450 | 1350 | 269.1 | 4.5 |
| G2 | 450 | 1350 | 268.2 | 9 |
| G3 | 450 | 1350 | 267.3 | 13.5 |
| G4 | 450 | 1350 | 266.4 | 18 |

Performance Testing (I) Drying Shrinkage Test

A drying shrinkage test of the mortar was conducted according to "Standard test method for drying shrinkage of mortar" (JC/T 603-2004), and a length of the mortar was measured by a vertical mortar shrinkage dilatometer with an accuracy of ±0.001 mm. A water loss of the mortar was determined by changes in a mass of the mortar.

A drying shrinkage test was conducted using a prismatic mortar of 40 mm×40 mm×160 mm. The mortar was placed at a room temperature (20° C.±3° C.) for 1 d, a mold was removed, a probe was pasted immediately after the mold was removed, and the mortar was maintained in a standard maintenance room for 1 d. At an age of 3 d, the mortar was removed from the standard maintenance room, and immediately moved into a constant-temperature and constant-humidity room to measure an initial length and an initial mass of the mortar. Each mortar length was measured three times, and an average of the three results was taken as a final result. At time intervals of 3 d, 7 d, 14 d, and 28 d, the length and mass of the mortar were tested.

Figure 2:
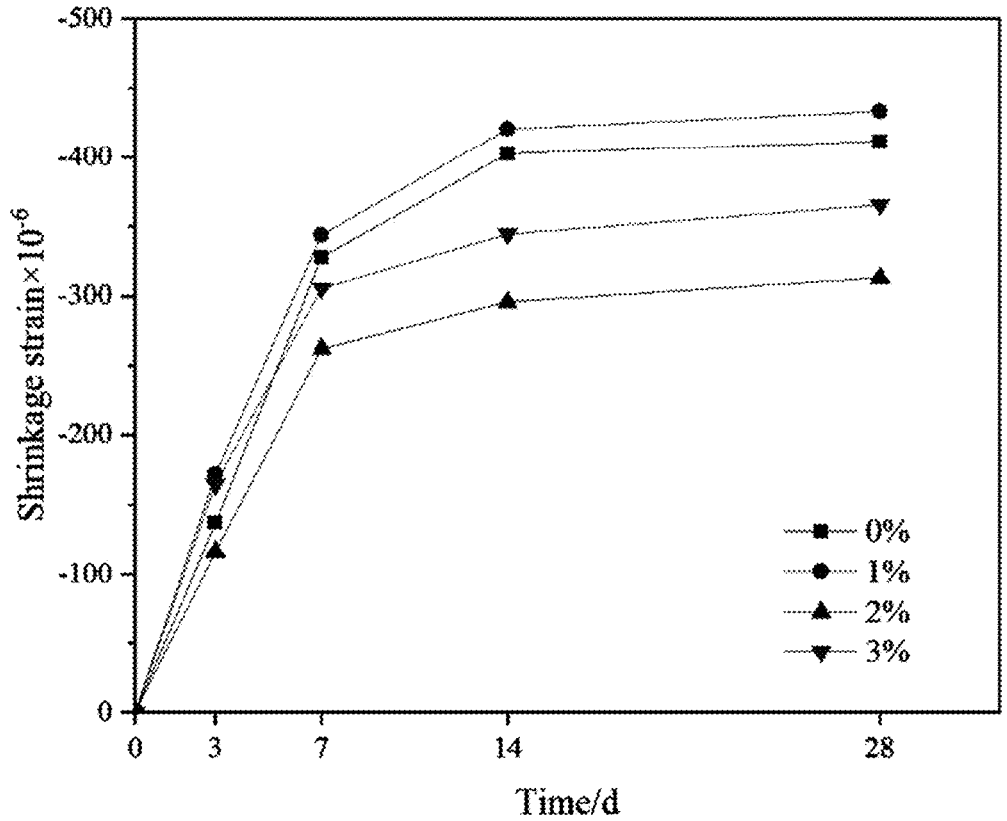
FIG. 2 shows an influence of the GO/BA/IBTS composite emulsion on drying shrinkage of a mortar.

FIG. 2 showed an influence of the GO/BA/IBTS composite emulsion on drying shrinkage of the mortar.

It was seen from FIG. 2 that with an increase of age, the drying shrinkage of mortar increased gradually. The mortar of the blank group had 80% and 98% of the drying shrinkage at 7 d and 14 d, respectively, of that at 28 d, indicating that the drying shrinkage of the mortar mainly occurred before the 14th day of maintenance. After 14 d of age, the drying shrinkage process appeared to slow down obviously, and an increasing speed of the drying shrinkage decreased significantly. The content of GO/BA/IBTS composite emulsion had an inhibitory effect on the drying shrinkage of mortar with an increase of the content, showing a trend of increasing and then decreasing. When the GO/BA/IBTS composite emulsion had a content of 2% to 3%, the drying shrinkage of mortar was smaller than that of the mortar in a blank group of the same age. When the GO/BA/IBTS composite emulsion had a content of 2%, the mortar has the minimum drying shrinkage, and has drying shrinkage after maintaining for 28 d of only 76% of that of the mortar in the blank group.

(II) Water Loss Experiment

A water loss of the mortar was determined by changes in a mass of the mortar.

Figure 3:
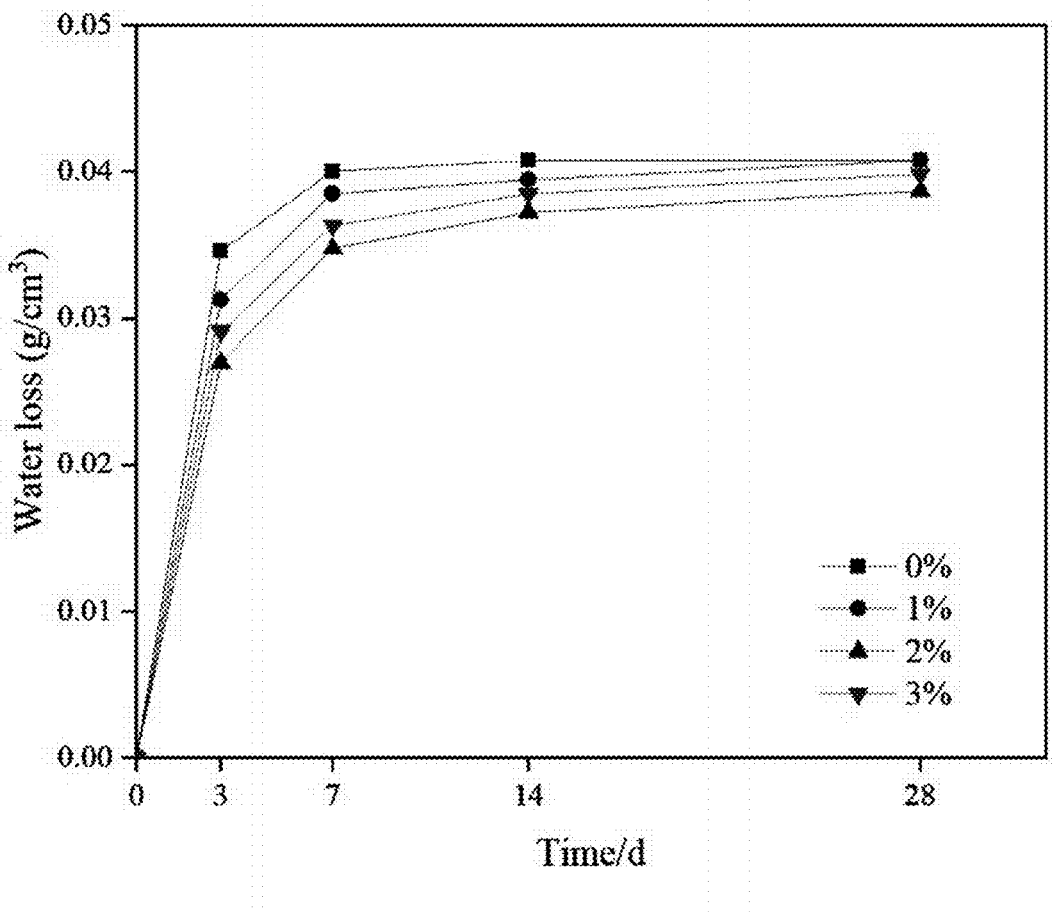
FIG. 3 shows an influence of the GO/BA/IBTS composite emulsion on water loss of the mortar.

FIG. 3 showed an influence of the content of the GO/BA/IBTS composite emulsion on water loss of the mortar.

It was seen from FIG. 3 that with the increase of age, the mortar of the silane composite emulsion and the mortar of the blank group each had gradually increasing water loss. The water loss of the mortar was mainly concentrated in the first 14 d of maintenance; after more than 14 d, an increase rate and an increase of the water loss of the mortar each were significantly reduced. This was because the water lost in an early stage was surface water, which was easy to be lost with a high rate; in a later stage, there was mainly internal water loss, with a lower rate. However, the mortar mixed with the GO/BA/IBTS composite emulsion had water loss less than that of the mortar in the blank group; after 14 d of maintenance, when the GO/BA/IBTS composite emulsion had a content of 1 wt %, 2 wt %, and 3 wt %, the water loss of the mortar was reduced by 3.36%, 8.77%, and 5.73%, respectively, compared with the mortar in the blank group of the same age. Therefore, the GO/BA/IBTS composite emulsion had an optimal effect of inhibiting the water loss at a content of 2%.

(III) Test of Mechanical Properties

The mechanical properties of the mortar were tested according to "Method of testing cements-Determination of strength (ISO)" (GB/T 17671-1999). Three groups of mortar were prepared, maintained in a constant-temperature and constant-humidity room for 7 d, 14 d, and 28 d, respectively, and then taken out. The flexural strength and compressive strength of each mortar were tested by an automatic pressure testing machine.

Figure 4:
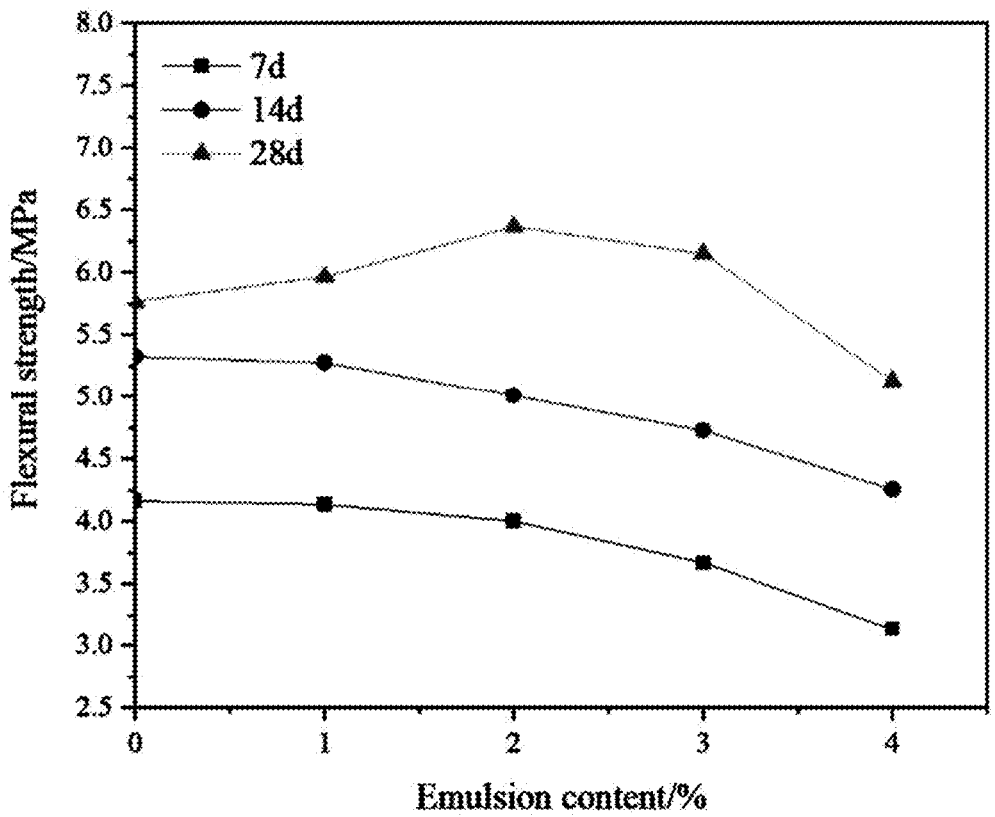
FIG. 4 shows an influence of the GO/BA/IBTS composite emulsion on a flexural strength of the mortar.
Figure 5:
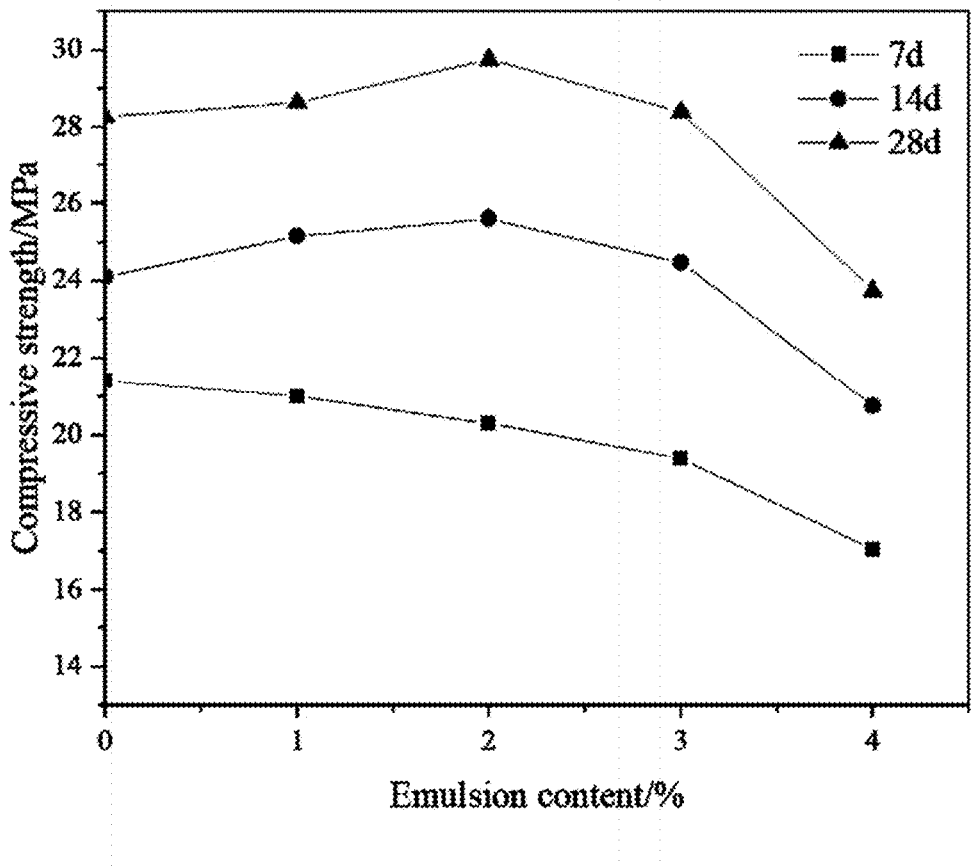
FIG. 5 shows an influence of the GO/BA/IBTS composite emulsion on a compressive strength of the mortar.

FIG. 4 showed an influence of the GO/BA/IBTS composite emulsion on the flexural strength of the mortar; and FIG. 5 showed an influence of the GO/BA/IBTS composite emulsion on a compressive strength of the mortar.

It was seen from FIG. 4 that the flexural strength of the mortar mixed with the GO/BA/IBTS composite emulsion was significantly improved at 14 d and 28 d of maintenance, indicating that the GO/BA/IBTS composite emulsion could improve the flexural strength of the mortar. The GO/BA/IBTS composite emulsion at a content of 2% had an optimal effect, and the flexural strength of mortar increased by 10% at 28 d.

It was seen from FIG. 5 that the compressive strength of the mortar was improved when the GO/BA/IBTS composite emulsion had a content of 1 wt %, 2 wt %, and 3 wt % at 14 d and 28 d of maintenance; and at the content of 2 wt %, an improvement effect of the compressive strength reached a maximum, which was 5% higher than that of the mortar in the blank group.

This was because active groups on mixed silane molecules reacted with hydroxyl groups on a surface of the mortar, so as to form a layered hydrophobic structure, thereby slowing down water loss inside the mortar. The butyl acrylate was dehydrated to form network-shaped polymer fibers, which filled pores of a cement matrix, thereby improving a strength of the matrix. A silica gel generated by hydrolysis of the sodium silicate reacted with calcium ions to generate a C—S—H gel, which filled the pores of the matrix to improve an early strength of the matrix. GO with a large specific surface area and oxygen-containing functional groups on a surface provided growth sites for hydration products, and promoted the hydration products to form a regular and dense structure in a template manner; these dense hydration products filled the voids of the cement matrix, thus improving a pore structure and increasing a density of the cement matrix. In addition, the GO could also block microcrack propagation. The above three mechanisms worked together, such that the mortar mixed with the GO/BA/IBTS composite emulsion had significantly-reduced drying shrinkage, a greatly-reduced probability in crack generation due to the drying shrinkage, and an improved mortar strength. However, an excessive silane material content might lead to a highly slow hydration of the cement, adversely affecting the strength of the mortar.

(IV) Morphological Characterization

Figure 6:
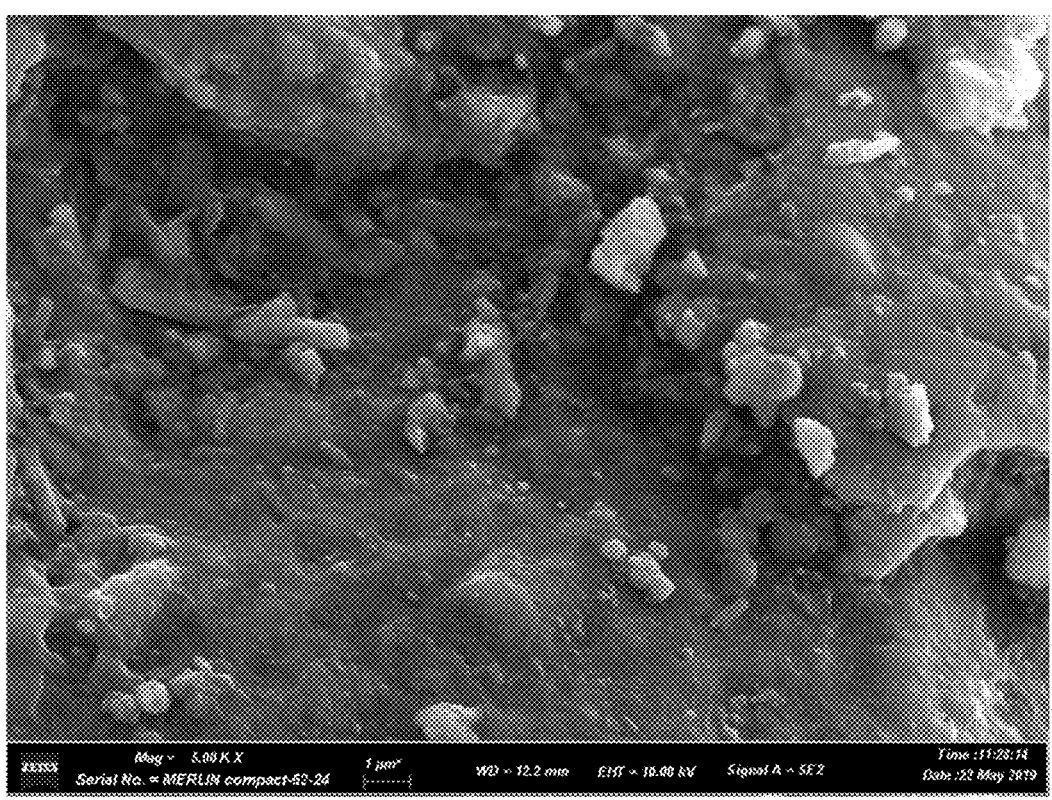
FIG. 6 shows an internal scanning electron microscopy (SEM) image of a mortar of a blank group.
Figure 7:
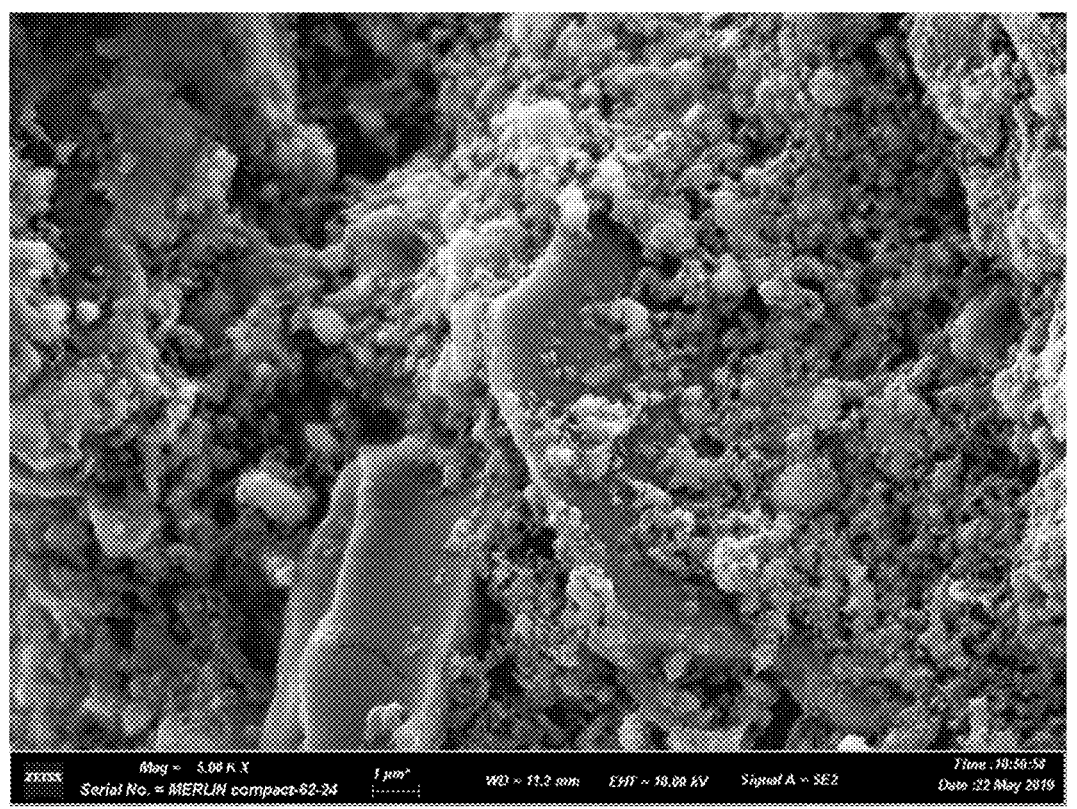
FIG. 7 shows a SEM image of the mortar when the GO/BA/IBTS composite emulsion has a content of 2 wt %.

On a 28th day of maintenance, samples were tapped inside the mortar, and an internal appearance of the mortar was observed with a thermal field emission scanning electron microscope (Merlin Compact, Zeiss, Germany). FIG. 6 showed a microstructure inside the mortar in the blank group magnified by 5,000 times; and FIG. 7 showed a microstructure inside the mortar magnified by 5,000 times when the GO/BA/IBTS composite emulsion had a content of 2 wt %.

It was seen from FIG. 6 that the mortar in the blank group had a relatively flat internal appearance, and there were some tiny particles on the surface, which were the appearance of cement hydration products. It was seen from FIG. 7 that after adding the GO/BA/IBTS composite emulsion, an obvious flocculent structure appeared inside the mortar, and the flocculate structure further formed a layered structure with a certain thickness.

(V) Energy Spectrum Analysis

Figure 8A:
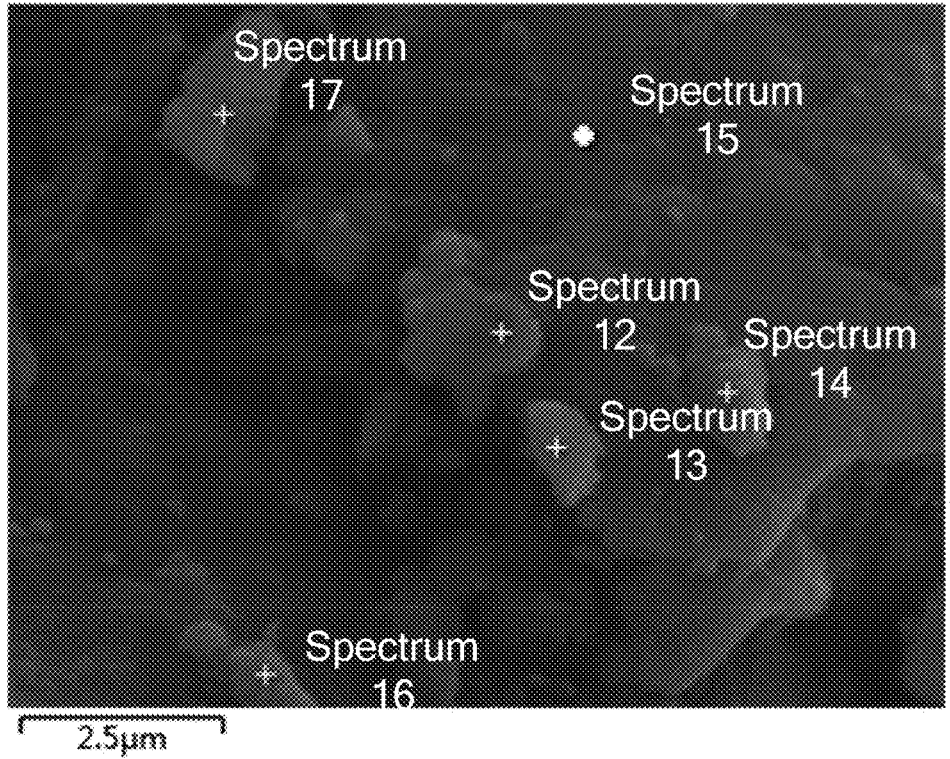
FIG. 8A and FIG. 8B show energy spectrum analysis results of the blank group.
Figure 8B:
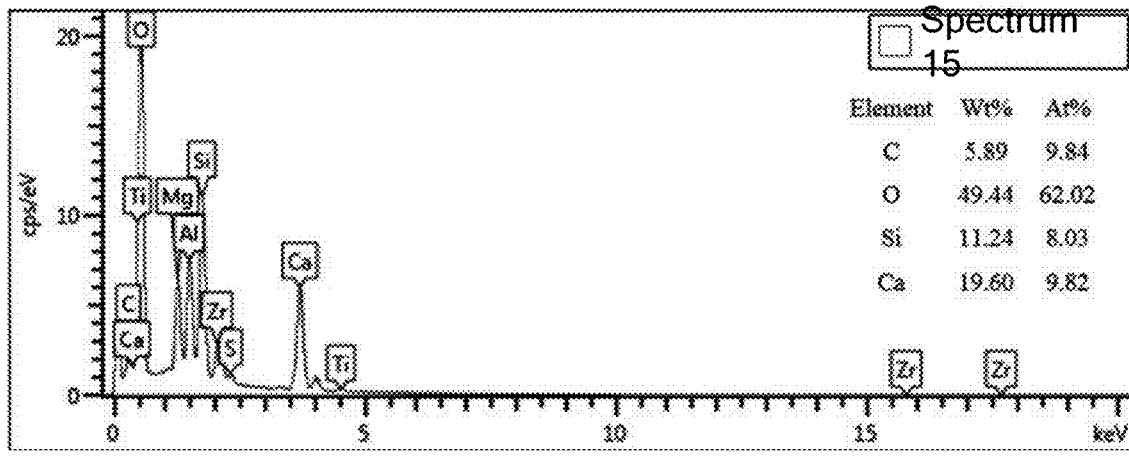
Figure 9A:
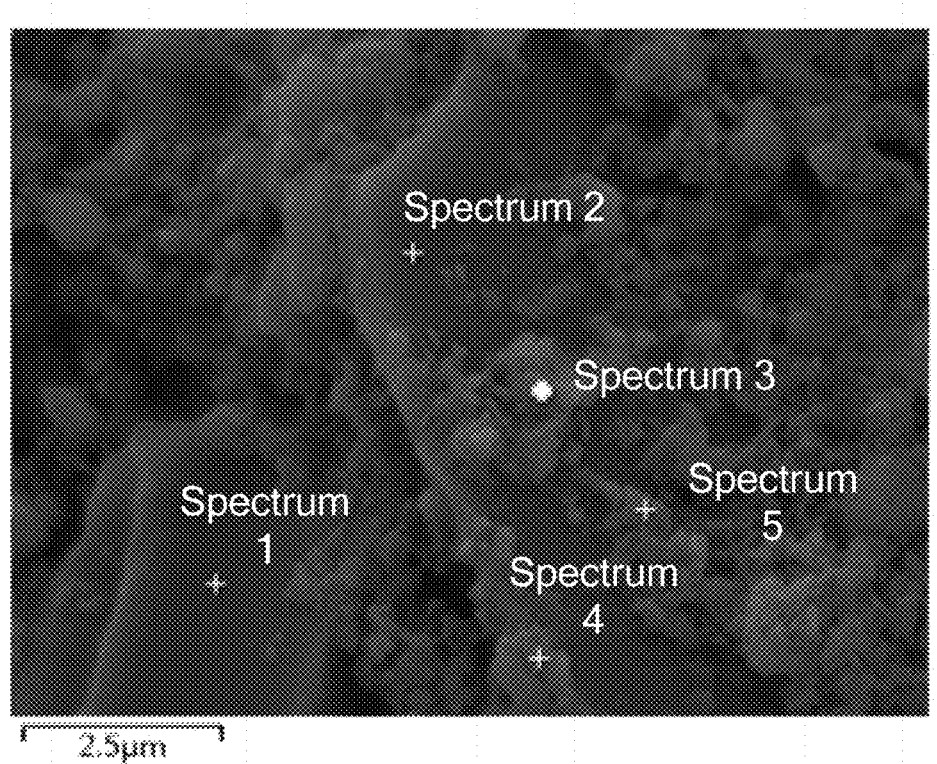
FIG. 9A and FIG. 9B show energy spectrum analysis results of the mortar when the GO/BA/IBTS composite emulsion has a content of 2 wt %.
Figure 9B:
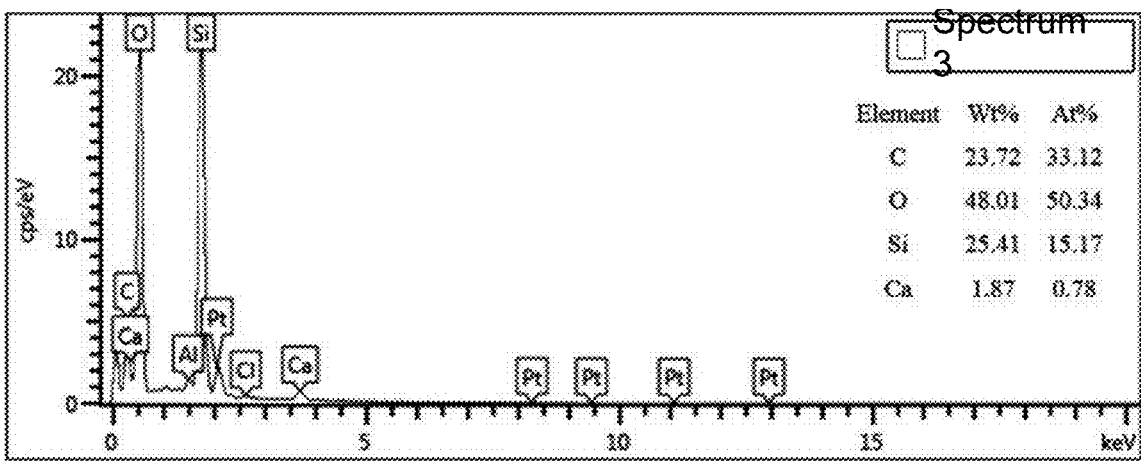

Samples were tapped inside the 28-day-maintained mortar, and then subjected to energy spectrum analysis. FIG. 8A and FIG. 8B showed energy spectrum analysis results of the blank group, where FIG. 8A was a schematic diagram of energy spectrum points of the mortar, and FIG. 8B was scanning results of the energy spectrum points of the mortar. FIG. 9A and FIG. 9B showed energy spectrum analysis results of the mortar when the GO/BA/IBTS composite emulsion had a content of 2 wt %, where FIG. 9A was a schematic diagram of energy spectrum points of the mortar, and FIG. 9B was scanning results of the energy spectrum points of the mortar.

Comparing an element content in FIG. 8A and FIG. 8B and FIG. 9A and FIG. 9B, it was found that contents of Si and C elements in the mortar mixed with the GO/BA/IBTS composite emulsion each were greatly increased compared with that of the mortar in the blank group. This indicated that the silane composite emulsion was well combined with the mortar, and it proved that a flocculent structure under the SEM was formed by the silane composite emulsion. After adding the GO/BA/IBTS composite emulsion, a content of the C element in the mortar increased significantly, this was mainly caused by the doping of graphene oxide in the GO/BA/IBTS composite emulsion.

(VI) Infrared Spectral Analysis

Figure 10:
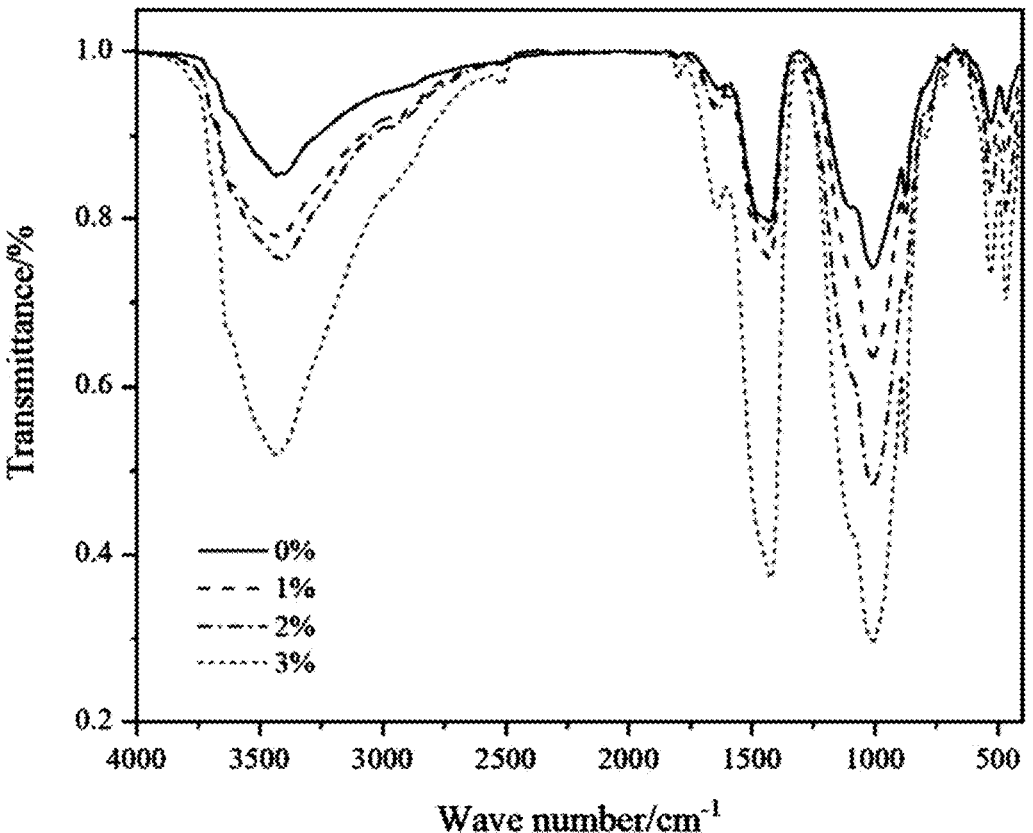
FIG. 10 shows an infrared spectrum of the mortar after the silane composite emulsion is internally mixed.

The mortar mixed with the silane composite emulsion was tested by a Fourier transform infrared spectrometer (Bruker TENSOR II), and results were shown in FIG. 10.

Compared with the mortar in the blank group, the mortar mixed with the silane composite emulsion had obviously different vibration peaks at wave numbers around 1,000 cm$^{-1}$, 1,500 cm$^{-1}$, and 3,500 cm$^{-1}$. The vibration peak around 1,000 cm$^{-1}$ was a characteristic peak generated by Si—O—C vibration absorption, indicating that the silane composite emulsion was well combined with the mortar. It is generally believed that the silane composite emulsion undergoes hydrolysis under the action of air and water, and forms silanol; the newly-generated silanol reacts with hydroxyl groups on the surface of a cement matrix to form a siloxane chain by hydrogen bonding, and is dehydrated and condensed to form a silane hydrophobic layer with Si—O—C characteristic bonds. The vibration peaks at 1,500 cm$^{-1}$ and 3,500 cm$^{-1}$ were caused by the vibration of C=C and —OH bonds, respectively, indicating that the mortar mixed with the silane composite emulsion included hydroxyl and carboxyl groups. The intensity of the three vibration peaks increased with an increase of the content of the silane composite emulsion.

It can be seen from the above tests that, the graphene oxide/butyl acrylate/silane composite emulsion is used as an anti-shrinkage agent of the cement-based material, which can improve a crack resistance of the cement-based material while ensuring a strength of the cement-based material.

The above descriptions are merely preferred implementations of the present disclosure. It should be noted that a person of ordinary skill in the art may further make several improvements and modifications without departing from the principle of the present disclosure, but such improvements and modifications should be deemed as falling within the protection scope of the present disclosure.

What is claimed is:

1. A cement-based material, comprising a graphene oxide/butyl acrylate/silane composite emulsion as an anti-shrinkage agent in a cement-based material, wherein the graphene oxide/butyl acrylate/silane composite emulsion comprises graphene oxide, butyl acrylate, isobutyltriethoxysilane, sodium silicate, an emulsifier, a dispersant, and water; and wherein the graphene oxide has a sheet thickness of 0.8 nm to 1.2 nm and a diameter of 30 nm to 70 nm.

2. The cement-based material according to claim 1, wherein the emulsifier comprises a first emulsifier being one or more selected from the group consisting of sorbitan monooleate, propylene glycol fatty acid ester, and sorbitan monostearate, and a second emulsifier being one or more selected from the group consisting of fatty acid polyoxyethylene ether, polysorbate 20, and sodium lauryl sulfate (SLS).

3. The cement-based material according to claim 2, wherein the graphene oxide/butyl acrylate/silane composite emulsion comprises the following components by mass percentage:

| | |
|---|---|
| the graphene oxide | 0.001% to 0.5%; |
| the isobutyltriethoxysilane | 15% to 70%; |
| the butyl acrylate | 15% to 70%; |
| the sodium silicate | 10% to 40%; |
| the first emulsifier | 0.1% to 2%; |

-continued

| | |
|---|---|
| the second emulsifier | 0.1% to 3%; |
| the dispersant | 0.1% to 1%; and |
| water | the balance. |

4. The cement-based material according to claim 3, wherein a preparation method of the graphene oxide/butyl acrylate/silane composite emulsion comprises the following steps:
    (1) conducting first mixing on the first emulsifier, the butyl acrylate, the isobutyltriethoxysilane, and the dispersant to obtain an oil phase;
    (2) conducting second mixing on the graphene oxide, the second emulsifier, the sodium silicate, and water to obtain an aqueous phase; and
    (3) adding the oil phase to the aqueous phase to conduct emulsification to obtain the graphene oxide/butyl acrylate/silane composite emulsion; wherein
    step (1) and step (2) are conducted in any order.

5. The cement-based material according to claim 4, wherein the first mixing is conducted at 1,000 r/min to 2,200 r/min and 30° C. to 65° C.; and
    the second mixing is conducted at 1,000 r/min to 2,200 r/min and 30° C. to 65° C.

6. The cement-based material according to claim 4, wherein the emulsification is conducted at 30° C. to 80° C. for 4 h to 8 h by stirring at 1,300 r/min to 2,500 r/min.

7. The cement-based material according to claim 1, wherein the dispersant is polyethylene glycol 2000 (PEG 2000).

8. The cement-based material according to claim 1, wherein a use method comprises the following steps:
    mixing the graphene oxide/butyl acrylate/silane composite emulsion with the cement-based material and water to obtain a cement mortar; and
    conducting maintenance on the cement mortar.

9. The cement-based material according to claim 8, wherein the graphene oxide/butyl acrylate/silane composite emulsion has a mass of 1% to 3% of a mass of the cement-based material, and has a solid content of 70% to 90%.

10. The cement-based material according to claim 9, wherein the graphene oxide/butyl acrylate/silane composite emulsion has the mass of 2% of the mass of the cement-based material.

11. The cement-based material according to claim 8, wherein the cement mortar has a water-cement ratio of 0.4 to 0.6 and a cement-sand ratio of 1:3.

12. The cement-based material according to claim 8, wherein the maintenance is conducted at 15° C. to 25° C. with a relative humidity of greater than or equal to 50%.

13. A graphene oxide/butyl acrylate/silane composite emulsion, comprising graphene oxide, butyl acrylate, isobutyltriethoxysilane, sodium silicate, an emulsifier, a dispersant, and water;
    wherein the graphene oxide has a sheet thickness of 0.8 nm to 1.2 nm and a diameter of 30 nm to 70 nm.

14. The graphene oxide/butyl acrylate/silane composite emulsion according to claim 13, wherein the emulsifier comprises a first emulsifier being one or more selected from the group consisting of sorbitan monooleate, propylene glycol fatty acid ester, and sorbitan monostearate, and a second emulsifier being one or more selected from the group consisting of fatty acid polyoxyethylene ether, polysorbate 20, and SLS.

15. The graphene oxide/butyl acrylate/silane composite emulsion according to claim 14, comprising the following components by mass percentage:

| | |
|---|---|
| the graphene oxide | 0.001% to 0.5%; |
| the isobutyltriethoxysilane | 15% to 70%; |
| the butyl acrylate | 15% to 70%; |
| the sodium silicate | 10% to 40%; |
| the first emulsifier | 0.1% to 2%; |
| the second emulsifier | 0.1% to 3%; |
| the dispersant | 0.1% to 1%; and |
| water | the balance. |

16. The graphene oxide/butyl acrylate/silane composite emulsion according to claim 13, wherein the dispersant is PEG 2000.

\* \* \* \* \*